US006295067B1

(12) United States Patent
Dubnow

(10) Patent No.: US 6,295,067 B1
(45) Date of Patent: Sep. 25, 2001

(54) METHOD OF MANUFACTURING A 3D VIEWING DISK

(76) Inventor: Richard Dubnow, 4959 SW. Dogwood Dr., Lake Oswego, OR (US) 97035

( * ) Notice: Subject to any disclaimer, the term of this patent is extended or adjusted under 35 U.S.C. 154(b) by 0 days.

(21) Appl. No.: 09/267,540

(22) Filed: Mar. 12, 1999

(51) Int. Cl.[7] .......... G95T 15/00

(52) U.S. Cl. .......... 345/419; 345/7; 348/42

(58) Field of Search .......... 345/419; 348/42, 348/43, 46; 350/143; 352/59; 353/7

(56) References Cited

U.S. PATENT DOCUMENTS

| | | | |
|---|---|---|---|
| 2,713,015 | 7/1955 | Paulsohn . | |
| 4,170,415 * | 10/1979 | Lemesshewsky et al. | 355/22 |
| 4,367,486 * | 1/1983 | Eichenlaub | 358/88 |
| 4,678,689 | 7/1987 | Phillips . | |
| 4,957,361 * | 9/1990 | Shaw | 352/59 |
| 4,966,436 | 10/1990 | Mayhew et al. . | |
| 5,371,562 | 12/1994 | Hahm et al. . | |
| 5,510,162 | 4/1996 | Brown . | |
| 5,583,971 | 12/1996 | Lo . | |
| 5,680,171 | 10/1997 | Lo et al. . | |
| 5,703,624 | 12/1997 | van Kruistum . | |
| 5,929,859 * | 7/1999 | Meijers | 345/419 |
| 6,031,564 * | 2/2000 | Ma et al. | 348/43 |
| 6,088,006 * | 7/2000 | Tabata | 345/7 |

* cited by examiner

*Primary Examiner*—Mark Zimmerman
*Assistant Examiner*—Huedung X. Cao
(74) *Attorney, Agent, or Firm*—John Smith-Hill; Smith-Hill and Bedell

(57) ABSTRACT

A transparency embodying left and right stereoscopic images of a selected scene, positioned to provide a 3D image of the selected scene when viewed using a 3D viewing device, is made by creating first and second image data files representing the left and right stereoscopic images respectively of the selected scene, employing the first and second image data files to create a stereo image data file representing the left and right stereoscopic images in predetermined relative positions, and employing the stereo image data file to create a transparency image incorporating the left and right stereoscopic images.

17 Claims, 3 Drawing Sheets

METHOD OF MANUFACTURING A 3D VIEWING DISK

BACKGROUND OF THE INVENTION

This invention relates to a method of manufacturing a 3D viewing disk.

A known type of 3D viewing disk which can be fitted in a stereoscopic viewing device, such as the device sold under the designation VIEWMASTER, is made of stiff opaque sheet material and is formed with 14 substantially rectangular apertures which are equiangularly spaced about, and are equidistant from, the center of the disk. Seven pairs of transparencies, representing left and right stereoscopic images respectively of seven scenes, are accommodated in the 14 apertures respectively.

The stereoscopic viewing device has two eyepieces for viewing simultaneously, with the left and right eyes respectively, one pair of transparencies so that the user can view a 3D image of the scene. The viewing device includes an advancing mechanism which engages indexing holes in the disk for rotating the disk to seven indexed positions allowing the user to view 3D images of the seven scenes in succession.

The opaque sheet material may be two cards which are made of paperboard material and are glued together with the 14 transparencies held between the cards.

In one practical method of manufacturing a 3D viewing disk, a 3D camera is used to capture left eye and right eye images of a scene on photographic transparency film. The transparency film is then used to generate corresponding internegatives and the two internegatives of one pair are mounted on a carrier in carefully controlled relative positions and orientations. The carrier is placed in an optical printer which makes multiple copies of the left eye image and multiple copies of the right eye image on respective rolls of receiving film. The carrier serves to position the internegatives precisely relative to the frame of the receiving film, and accordingly the images are located with a high degree of precision relative to the frame of the receiving film. The rolls of receiving film are die cut into individual transparencies and the left and right eye transparencies for a given scene are attached to a first of the two cards using registration elements to ensure that the two die cut transparencies are in the proper relative positions and orientations. The left and right eye transparencies for the next scene are then attached to the first card, and so on until all seven pairs of transparencies have been attached to the first card. Finally, the second card is attached to the first card and the 14 transparencies are then held securely between the cards.

3D viewing disks of the kind described above are used as toys, in which case many thousand copies of a given disk might be made. However, the 3D viewing disk has also found a market in short runs as a promotional tool, and in this case the purchaser may require as few as ten copies.

The conventional method of fabricating a 3D viewing disk requires complex machinery which must be maintained and adjusted to ensure that the die cut transparencies will be properly positioned in the completed disk. The cost per disk of manufacturing a long run of disks is very low, but the nature of the manufacturing process makes it expensive to manufacture a short run of disks. Further, the lead time required to obtain a short run of disks is long.

SUMMARY OF THE INVENTION

The present invention provides a method of manufacturing 3D viewing disks that are structurally compatible with the stereoscopic viewing device sold under the trademark VIEWMASTER using computer technology, rather than mechanical technology, to position the images. The method allows a short run of viewing disks to be manufactured at a substantially lower cost per disk than the conventional method of manufacturing 3D viewing disks.

According to a first aspect of the present invention there is provided a method of manufacturing a transparency embodying left and right stereoscopic images of a selected scene, positioned to provide a 3D image of said selected scene when viewed using a 3D viewing device, said method including creating first and second image data files representing said left and right stereoscopic images respectively of the selected scene, employing the first and second image data files to create a stereo image data file representing said left and right stereoscopic images in predetermined relative positions, and employing the stereo image data file to create a transparency image incorporating the left and right stereoscopic images.

According to a second aspect of the present invention there is provided a method of manufacturing a 3D viewing disk for viewing in a stereoscopic viewer, comprising creating a first stereo image data file representing left and right stereoscopic images of a first selected scene in appropriate relative orientations and positions in a graphics plane to create a 3D image of the first selected scene, creating a second stereo image data file representing left and right stereoscopic images of a second selected scene in appropriate relative orientations and positions in a graphics plane to create a 3D image of the second selected scene, employing the first and second stereo image data files to create a multiple stereo image data file representing the 3D image of the first selected scene and the 3D image of the second selected scene in appropriate relative orientations and positions in a graphics plane for separately viewing the 3D images of the first and second selected scenes using the 3D viewing disk, and employing the multiple stereo image data file to create a transparency image incorporating the 3D images of the first and second selected scenes.

BRIEF DESCRIPTION OF THE DRAWINGS

For a better understanding of the invention, and to show how the same may be carried into effect, reference will now be made, by way of example, to the accompanying drawings, in which.

The invention employs a computer which runs photographic manipulation and graphics layout programs to process data files representing images. In order to simplify the description, the following description refers in places to physical acts, such as moving, being performed on images. It will be understood that these references do not imply that these physical acts actually occur. These references are an abbreviated way of referring to the operation that must be performed on the data files so that these actions seem to be taken on the images that are represented by the data files.

DETAILED DESCRIPTION

Figure 1:
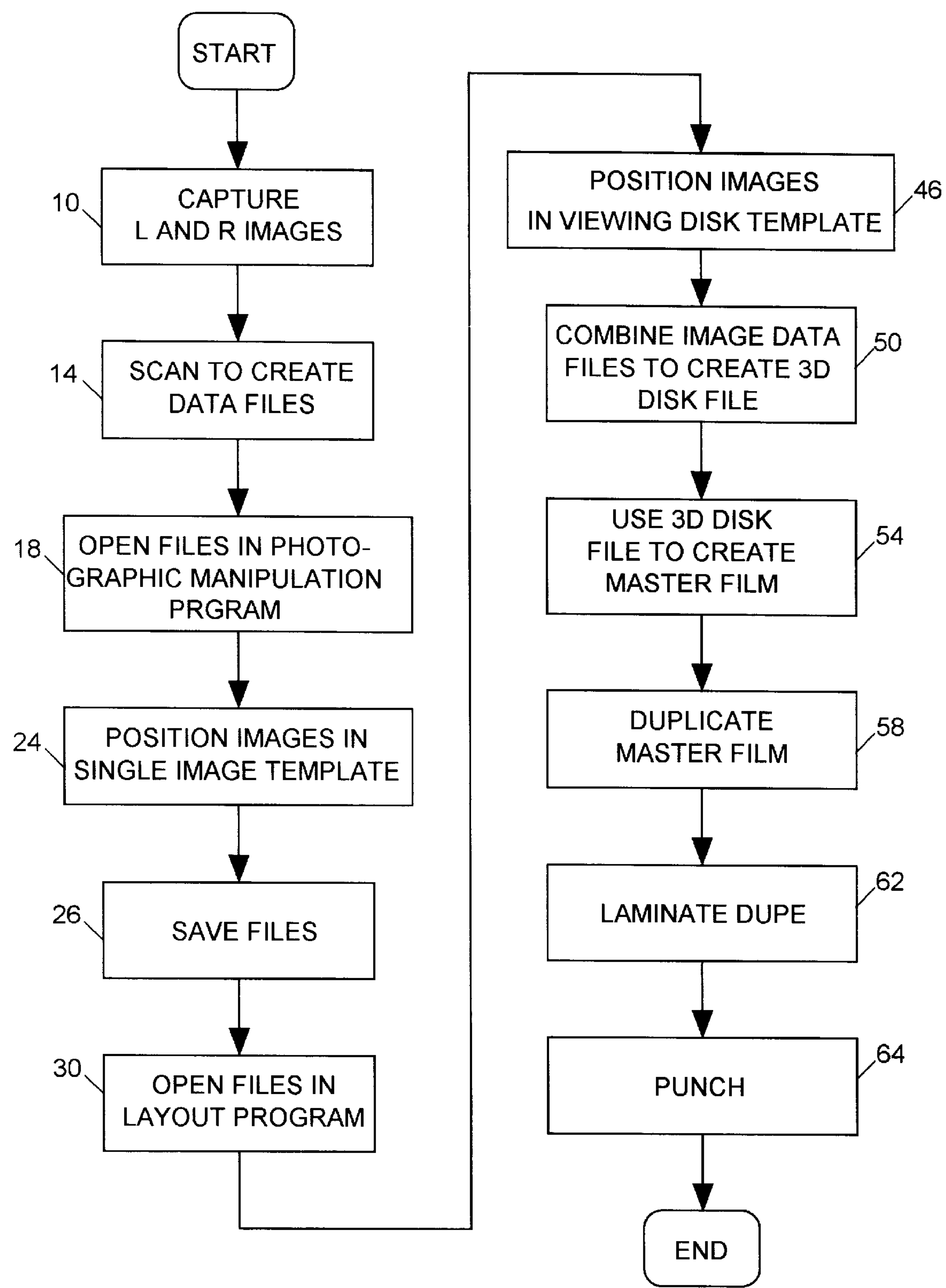
FIG. 1 is a flow chart illustrating one method of manufacturing 3D viewing disks.

Referring to FIG. 1, the first step in the first method in accordance with the invention is the same as in the conventional method of manufacturing the 3D viewing disk, namely employing a 3D camera to capture photographically a pair of left and right stereoscopic images of a selected scene (step 10). The 3D camera may be implemented using two separate synchronized cameras which capture separately the left and right stereoscopic images of the selected scene. The two photographic images are then scanned (step 14) using a high definition scanner, which creates a pair of image data files corresponding to the left and right stereoscopic images respectively. The image data files are stored an a conventional personal computer on which the operator can run a photographic manipulation program and a graphics layout program.

In step 18, the operator opens the two image data files in respective graphics planes of the photographic manipulation program, which may, for example, be Adobe Photoshop. The operator also opens a single image template file which presents the operator with a display, in a third graphics plane, of a single image template (FIG. 2) which includes two windows 20L, 20R of which the size and spacing are linearly related to the size and spacing of two diametrically opposed viewing apertures in the 3D viewing disk. Each window is provided with two vertical registration lines 22V and two horizontal registration lines 22H. The two windows are positioned at the left and right sides respectively of the computer's display monitor. The single image template file is created using known programming techniques.

Figure 2:
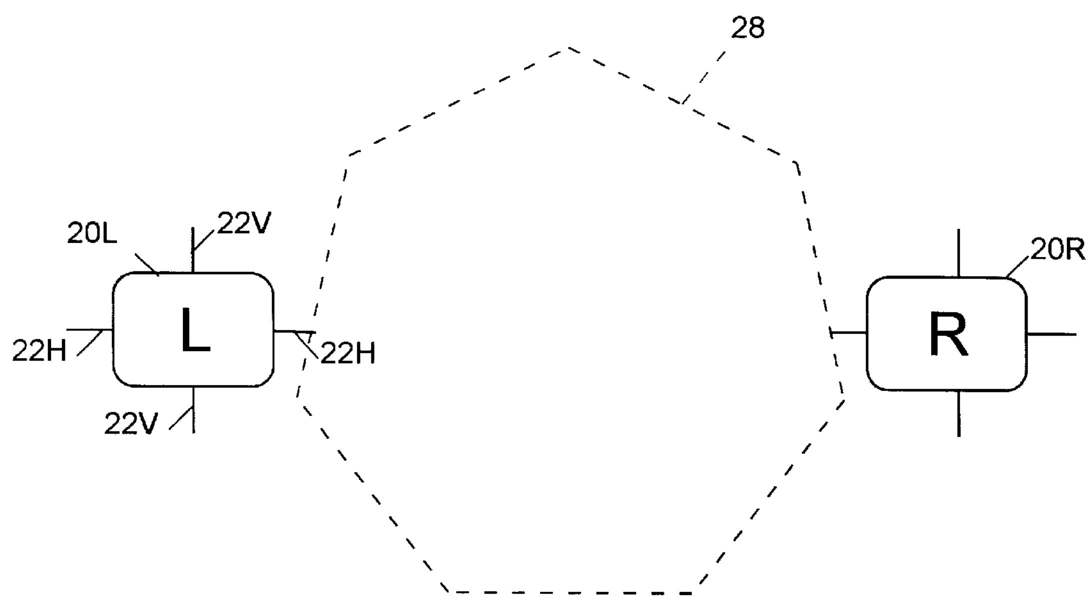
FIG. 2 illustrates a single image template.

In step 24, the operator uses the photographic manipulation program to position the left and right images in the proper orientation in the left and right windows respectively of the single image template. The display seen by the operator may be as shown in FIG. 2, where L and R represent the left and right images respectively. In this way, the two images are brought to approximately the proper positions relative to the registration lines 22. The operator then views the images using a 3D separating baffle (not shown), which allows the operator to view the left side of the computer's display with the left eye and the right side of the display with the right eye. The eye-brain combination fuses the left and right images and the operator makes fine adjustment of the positions of the left and right images to achieve the desired three dimensional effect. The operator crops the images, to remove material of the left and right images that is outside the windows. While operating in the photographic manipulation program, the operator can also add text to the images, repair defects in the images and do color correction. The operator then saves modified data files of the left and right images, including the registration lines (step 26).

The photographic manipulation program thus creates a pair of graphic objects, each of which includes an image and registration lines for positioning the image. In similar fashion, the operator uses the photographic manipulation program to create six additional pairs of graphic objects, each pair representing left and right images of a scene. The operator can also use the photographic manipulation program to create a caption or title as a further graphics object within a caption window 28 and save a title data file representing the title object.

Figure 3:
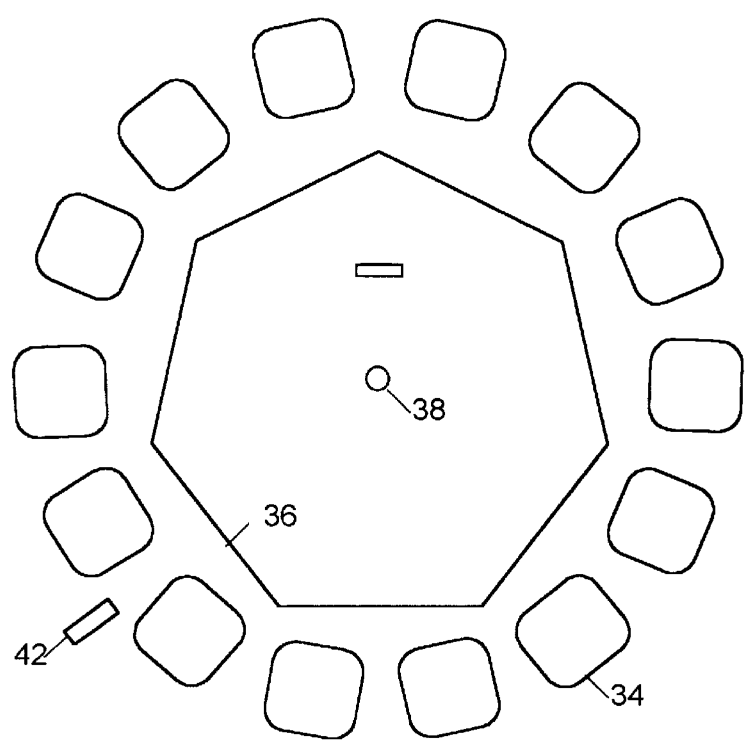
FIG. 3 illustrates a disk template.

In step 30, the operator opens the image data files and a disk graphics data file in the graphics layout program. Each file is opened in its own graphics plane, which allows the images to be moved relative to each other. Referring to FIG. 3, in the graphics layout program the disk graphics data file presents the operator with a display of a disk template having fourteen windows 34 of which the size, position and spacing are linearly related to the size, position and spacing of the viewing apertures in the 3D viewing disk. The windows 34 define the proper relative positions and orientations of each of the 14 graphic objects created in the graphics manipulation program. The disk template also includes a title window 36 which corresponds in size and location relative to the windows 34 to the title space on the conventional 3D viewing disk.

The disk template includes registration lines (not shown) to assist the operator in positioning the graphic objects. The registration lines of the disk template are at locations corresponding to the locations of the registration lines 20, 22 in the single image template. The disk template also includes a center feature 38, corresponding to the center of the viewing disk, and a feature 42 for specifying the location of at least one index hole.

It is preferred that the layout program be one that does not directly manipulate the files placed in the layout but manipulates a low resolution representation of the file. A suitable graphics layout program is Adobe Illustrator.

When the graphic object files are open in the layout program, the operator can see icons or thumbnails (low resolution images) representing the images and can position each object so that its registration lines 20, 22 line up with the proper registration lines of the disk template (step 46). The layout program combines the disk graphics data file with the image data files using vectors which specify the position of each graphic object in the disk template.

If a title object was created in the photographic manipulation program, the operator also opens the title data file in the graphics layout program and moves the title object to a desired position in the title window 36. If no title object was created in the photographic manipulation program, the operator can add a caption or title for the particular disk in the graphics layout program and can move the title object to a desired position.

In the layout program, the operator crops the images in order to remove the reference lines and any other portions of the graphics objects outside the boundary of the windows of the disk template.

The image that is then displayed in the graphics layout program is saved as a single graphics object in which the images created using the photographic manipulation program are combined with the disk graphics data file (step 50). In the event that the graphics layout program is Adobe Illustrator, the graphics object is saved as an encapsulated postscript (.eps) file.

In step 54, a film recorder is used to convert the disk graphics data file that was created using the layout program to a viewable image and record it photographically on a master film. A suitable film recorder is the Kodak LVT Film Recorder. The Kodak LVT Film Recorder requires that the graphics data file be in .tif format. In the event that the disk file is an .eps file, it must be converted to a .tif file. This can be done using Adobe Photoshop or other photo editing software.

A slide duplicator is then used to make copies of the master film using a contact duplication process (step 58). Suitable slide duplicators are commercially available. The dupes are rectangular, and each dupe is laminated (step 62) between two protective rectangular sheets of transparent material such as 5 mil poly-clear laminate material having a 70 parts glue to 30 parts base, such as Mylar, mix. The laminated structure is punched so that it can be fitted in a stereoscopic viewing device (step 64). In step 64, a punch tool is used to punch a center hole at the position of the feature 38. The laminated structure is then placed on a mandrel which receives the center hole and the index holes for advancing rotation of the disk are then punched by reference to the feature 42. Finally, the outer periphery of the disk is punched using the center hole as a guide. It will be appreciated that with a suitable punch tool the center hole, the index holes and the periphery of the disk could be punched in a single operation.

It will be seen from the foregoing description that use of a known photographic manipulation program and a known layout program avoids the need for special purpose equipment for manufacturing 3D viewing disks. This allows relatively short runs of viewing disks to be manufactured economically.

Figure 4:
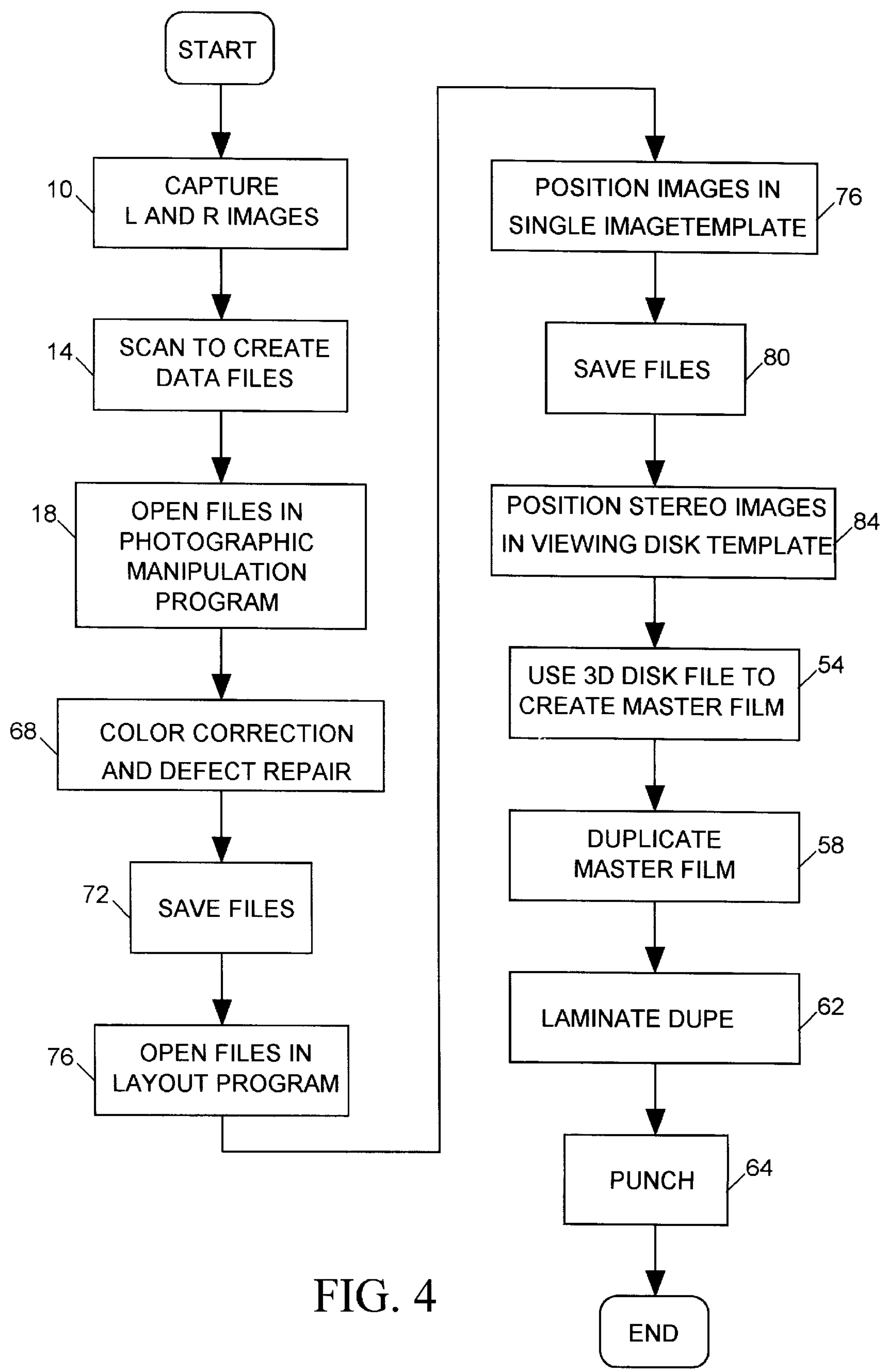
FIG. 4 is a flow chart illustrating a second method of manufacturing a 3D viewing disk.

In a second method in accordance with the invention, the photographic manipulation program is used for color correction of the image data files but is not used for positioning the images. Referring to FIG. 4, the image data files are opened in the photographic manipulation program and the operator does any necessary color correction and defect repair (step 68) and then saves the image data files (step 72). The image data files are then opened in the graphics layout program, which displays a single image template similar to that shown in FIG. 2. The operator employs the layout program to position the images so that each image is within one of the windows of the single image template, and the operator views the display using a 3D separating baffle and makes fine adjustment of the relative positions of the images to achieve the desired stereoscopic effect (step 76). The operator then saves the two images as a stereo image data file, with the registration lines attached to the image, and closes the single image template (step 80). The left and right images are connected and constitute a single graphics object. The operator opens the disk graphics data file for displaying the disk template and reopens the stereo image data file. The operator can then use the controls of the graphics layout program to position the graphics object relative to the disk template so that the registration lines of the graphics object are aligned with one of the seven sets of registration lines of the disk template (step 84). The subsequent steps of the method are similar to those of the method described with reference to FIG. 1.

In another modification, in the event that no color correction was necessary or the photographic manipulation could be carried out using the layout program, the image data files are opened in the graphics layout program without being first opened in the photographic manipulation program. In the modification, it might be necessary to convert the data file format or use a different film recorder.

It will be appreciated that the invention is not restricted to the particular embodiments that have been described, and that variations may be made therein without departing from the scope of the invention as defined in the appended claims and equivalents thereof. For example, although specific graphics programs have been mentioned, the invention is not restricted to use of these programs. Further, although the initial images are acquired photographically and scanned to create the image data files, the image data files could be created directly using electronic cameras coupled to produce 3D images. Moreover, in the foregoing description emphasis is not placed on whether an intermediate image is a negative or positive image of the scene represented by the image, because photographic images can be reversed photographically and data files representing images can be reversed by computer operations. Accordingly, whether an intermediate image created in a practical implementation of the invention is a negative or positive image is not intended to have a bearing on the scope of the following claims.

What is claimed is:

1. A method of manufacturing a transparency embodying left and right stereoscopic images of a selected scene, positioned to provide a 3D image of said selected scene when viewed using a 3D viewing device, said method including:

(a) creating first and second image data files representing said left and right stereoscopic images respectively of the selected scene, (b) employing the first and second image data files to create a stereo image data file representing said left and right stereoscopic images in predetermined relative positions, (c) employing the stereo image data file to create a transparency image incorporating the left and right stereoscopic images, wherein step (c) comprises employing the stereo image data file to create a photographic master film which embodies said transparency image, and the method further comprises:

employing the photographic master film to create a duplicate film, and laminating the duplicate film to at least one transparent protective sheet to form a laminated structure, and wherein said predetermined relative positions are such that the transparency image provides a 3D image of said selected scene when the duplicate film is viewed using said 3D viewing device.

2. A method according to claim 1, wherein step (a) comprises acquiring left and right stereoscopic photographic images of the selected scene and converting the left and right photographic images to the first and second image data files respectively.

3. A method according to claim 2, wherein step (b) comprises:

employing an image manipulation program to display images represented by the first and second image data files and a single image template defining left and right windows and reference indicia associated with the left and right windows respectively, employing the image manipulation program to position the images represented by the first and second image data files in the left and right windows respectively, and saving first and second modified image data files representing the left and right images with the respective reference indicia attached thereto.

4. A method according to claim 3, wherein step (b) further comprises:

using a graphics layout program to display the first and second modified image data files that were saved in the image manipulation program and a disk template defining multiple pairs of left and right windows and reference indicia associated with the left and right windows of each pair, employing the graphics layout program to position the images represented by the first and second modified image data files in the left and right windows respectively of one of said multiple pairs of left and right windows, with the reference indicia attached to the left and right images aligned with the reference indicia associated with the left and right windows respectively, and saving a composite data file, which represents the left and right images in the relative positions and orientations prescribed by alignment of the reference indicia attached to the first and second images with the reference indicia associated with the left and right windows respectively, as said stereo image data file.

5. A method according to claim 1, comprising using a photographic manipulation program for color correction of the images represented by the first and second image data files.

6. A 3D viewing disk made by a method in accordance with claim 1.

7. A method according to claim 3, wherein step (b) further comprises:

using a graphics layout program to display the first and second modified image data files that were saved in the image manipulation program and a template defining a pair of left and right windows and reference indicia associated with the left and right windows, employing the graphics layout program to position the images represented by the first and second modified image data files in the left and right windows respectively of the pair of windows, with the reference indicia attached to the left and right images aligned with the reference indicia associated with the left and right windows respectively, and saving a composite data file, which represents the left and right images in the relative positions and orientations prescribed by alignment of the reference indicia attached to the first and second images with the reference indicia associated with the left and right windows respectively, as said stereo image data file.

8. A method according to claim 1, wherein the left and right images in the transparency image are substantially equidistant from a center point, and the method further comprises:

cutting the laminated structure to circular form, wherein the center of the circular form substantially coincides with said center point.

9. A method of manufacturing a 3D viewing disk for viewing in a stereoscopic viewer, comprising:

(a) creating a first stereo image data file representing left and right stereoscopic images of a first selected scene in appropriate relative orientations and positions in a graphics plane to create a 3D image of the first selected scene, (b) creating a second stereo image data file representing left and right stereoscopic images of a second selected scene in appropriate relative orientations and positions in a graphics plane to create a 3D image of the second selected scene, (c) employing the first and second stereo image data files to create a multiple stereo image data file representing the 3D image of the first selected scene and the 3D image of the second selected scene in appropriate relative orientations and positions in a graphics plane for separately viewing the 3D images of the first and second selected scenes using the 3D viewing disk, and (d) employing the multiple stereo image data file to create a transparency image incorporating the 3D images of the first and second selected scenes, and wherein step (a) comprises acquiring left and right stereoscopic images of the first selected scene, converting the left and right stereoscopic images to first and second image data files respectively, running an image manipulation program which displays at least first, second and third active graphics planes in a common viewport, opening the first and second image data files in the image manipulation program in the first and second active graphics planes respectively, opening a template data file representing first and second windows in the third active graphics plane, manipulating the first image data file to position the image represented by the first image data file in the first window, and manipulating the second image data file to position the image represented by the second image data file in the second window.

10. A method according to claim 9, wherein step (a) comprises:

creating a pair of image data files representing left and right stereoscopic images respectively of the first selected scene, and employing an image manipulation program to combine the pair of image data files to form said first stereo image data file.

11. A method according to claim 9, wherein step (d) comprises employing the multiple stereo image data file to create a photographic transparency image.

12. A method according to claim 9, wherein step (a) comprises acquiring left and right stereoscopic photographic images of the first selected scene, converting the left and right stereoscopic photographic images to first and second image data files respectively, running an image manipulation program which displays at least first, second and third active graphics planes in a common viewport, opening the first and second image data files in the image manipulation program in the first and second active graphics planes respectively, opening a template data file representing first and second windows in the third active graphics plane, manipulating the first image data file to position the image represented by the first image data file in the first window, and manipulating the second image data file to position the image represented by the second image data file in the second window.

13. A method according to claim 9, wherein the template data file represents reference indicia associated with each window and the method further comprises saving the first image data file with the reference indicia associated with the first window attached thereto and saving the second image data file with the reference indicia associated with the second window attached thereto.

14. A method according to claim 9, comprising, between steps (b) and (c), creating third through seventh stereo image data files representing left and right stereoscopic images of third through seventh selected scenes respectively, the left and right stereoscopic images represented in each of the third through seventh stereo image data files being in appropriate relative orientations and positions in a graphics plane to create respective 3D images of the third through seventh selected scenes, and wherein step (c) comprises employing the first through seventh stereo image data files to create a multiple stereo image data file representing the 3D images of the first through seventh selected scenes in appropriate relative orientations and positions in a graphics plane for separately viewing the 3D images of the first through seventh selected scenes using the 3D viewing disk, and step (d) comprises employing the multiple stereo image data file to create a transparency image incorporating the 3D images of the first through seventh selected scenes.

15. A method of manufacturing a transparency embodying left and right stereoscopic images of a selected scene, positioned to provide a 3D image of said selected scene when viewed using a 3D viewing device, said method including:

(a) creating first and second image data files representing said left and right stereoscopic images respectively of the selected scene, (b) employing the first and second image data files to create a stereo image data file representing said left and right stereoscopic images in predetermined relative positions, and (c) employing the stereo image data file to create a transparency image incorporating the left and right stereoscopic images, and wherein step (b) comprises:

employing an image manipulation program to display images represented by the first and second image data files and a single image template defining left and right windows and reference indicia associated with the left and right windows respectively, employing the image manipulation program to position the images represented by the first and second image data files in the left and right windows respectively, and saving first and second modified image data files representing the left and right images with the respective reference indicia attached thereto.

16. A method according to claim 15, wherein step (a) comprises acquiring left and right stereoscopic photographic images of the selected scene and converting the left and right photographic images to the first and second image data files respectively.

17. A method according to claim 15, wherein step (b) further comprises:

using a graphics layout program to display the first and second modified image data files that were saved in the image manipulation program and a disk template defining multiple pairs of left and right windows and reference indicia associated with the left and right windows of each pair, employing the graphics layout program to position the images represented by the first and second modified image data files in the left and right windows respectively of one of said multiple pairs of left and right windows, with the reference indicia attached to the left and right images aligned with the reference indicia associated with the left and right windows respectively, and saving a composite data file, which represents the left and right images in the relative positions and orientations prescribed by alignment of the reference indicia attached to the first and second images with the reference indicia associated with the left and right windows respectively, as said stereo image data file.

* * * * *